UNITED STATES PATENT OFFICE.

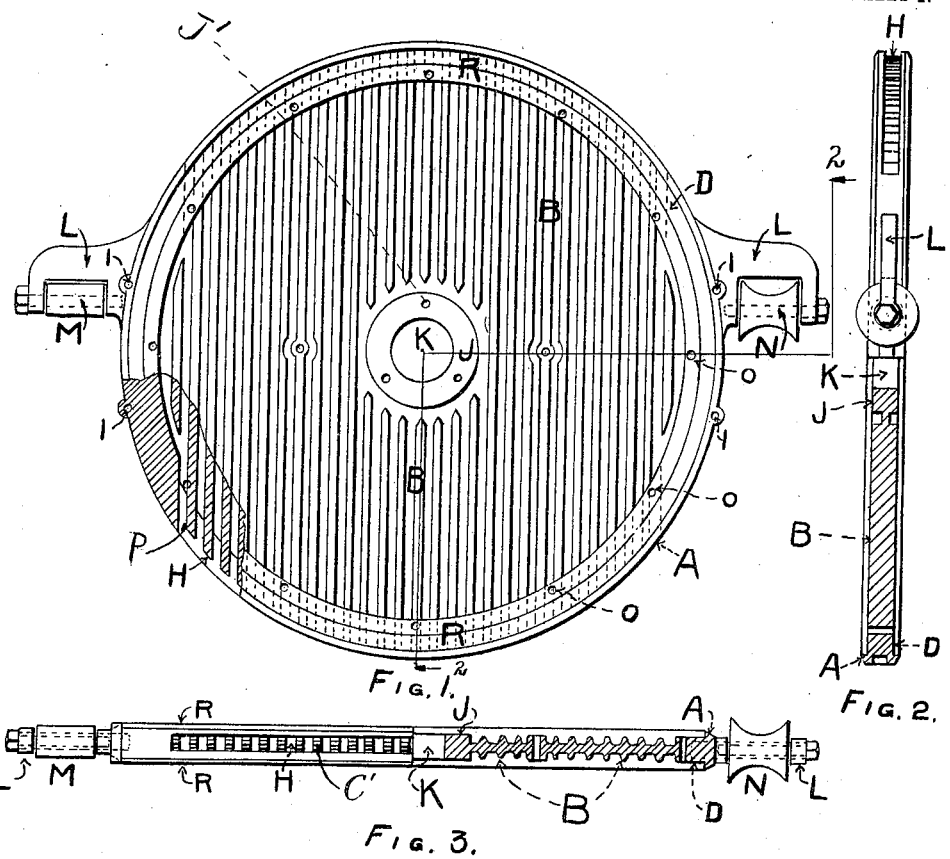
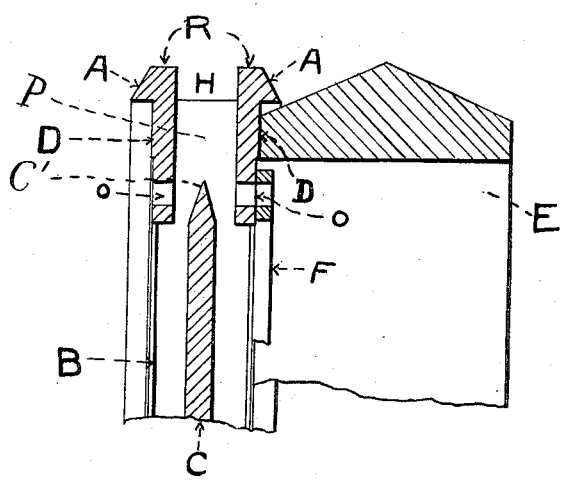

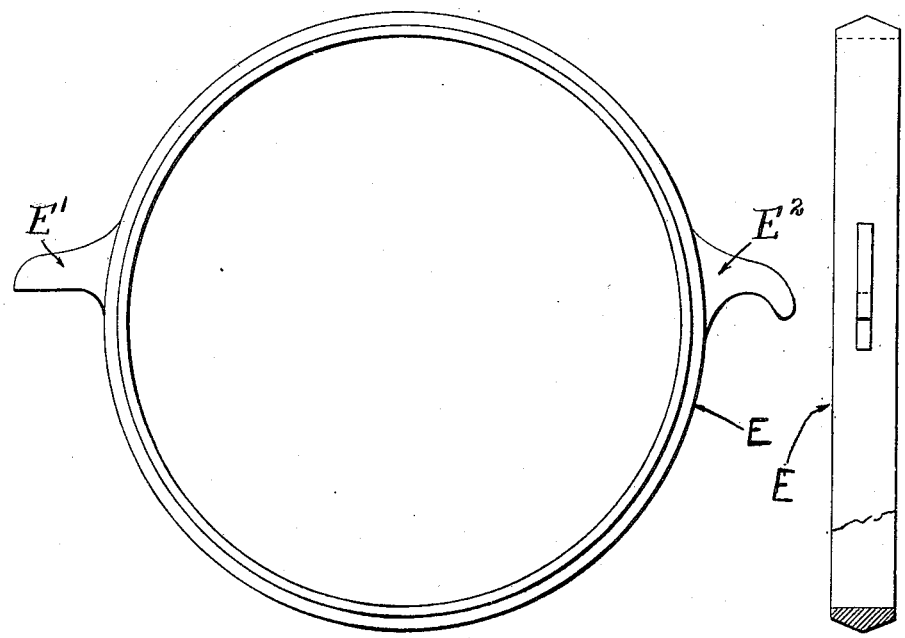
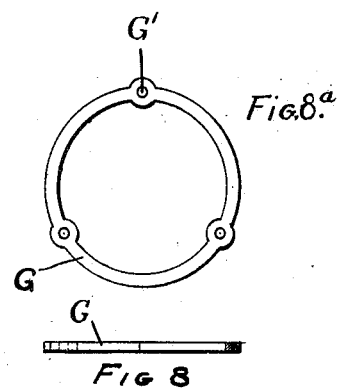

JOHN W. BILES, OF LOUISVILLE, KENTUCKY.

FILTER-PRESS PLATE.

No. 914,476.  Specification of Letters Patent.  Patented March 9, 1909.

Application filed October 10, 1907. Serial No. 396,717.

*To all whom it may concern:*

Be it known that I, JOHN W. BILES, a citizen of the United States, residing at Louisville, in the county of Jefferson and State of Kentucky, have invented certain new and useful Improvements in Filter-Press Plates, of which the following is a full, clear, and exact specification.

The invention relates to filter plates adapted to fit any standard press frame, the said plates being particularly adapted for use in retaining pulpy solids while fluid is being pressed therefrom, such as pressing the excessive fluid or liquids from distillers' and brewers' slops, glucose, starch, cassava, sugar beet pulp and similar refuse, or from any kind of wastes or slops.

The invention is also adapted for use in pressing the excessive liquids or moisture from washed clays and other minerals and the like.

The primary object of the invention is to provide an improved form of filtering plate of the described character which shall be simple and efficient in construction and operation, and in which the weight may be reduced to the minimum so that the same may be easily handled in service and at the same time while extracting the filtered fluid freely may be of sufficient strength to withstand great pressure.

A further object of the invention is to provide improved means in a filter press plate of the decsribed character for preventing the escape of liquids at the joining between the plates and the cell rings or drums, when in operation under pressure.

A further object of the invention is to provide improved means in a filter press plate of the character described for securing the ordinary perforated members or filtering screens or fabrics on the faces thereof.

A still further object of the invention is to provide an improved form of filter press plate in which a suitable packing may be inserted around the peripheral edge of the same.

To the attainment of these ends and the accomplishment of other new and useful objects as will appear, the invention consists in the features of novelty in the construction, combination and arrangement of the several parts, hereinafter more fully described and claimed and shown in the accompanying drawings, illustrating an exemplification of this invention, and in which—

Figure 1 is a face view of a filter press plate embodying the invention, a portion of the same near the periphery being in broken section, Fig. 2 is an end view partly in elevation and partly in section, taken on line 2—2 of Fig. 1, Fig. 3 is a view looking at Fig. 1 from the bottom, the quarter section of the plate bounded by broken line 2—2 being removed, Fig. 4 is an enlarged detail sectional view taken through the periphery of the plate between two of the longitudinal ribs and parallel therewith, Fig. 5 is a face view of a cell ring or drum adapted for use in separating plates embodying said invention, and Fig. 6 is a side view in elevation partly in section of the same, Fig. 7 is a face view of a portion or segment of the outer ring for holding any perforated member or filtering fabric or screen in position, and Fig. 8 is a face view of inner ring used for the same purpose, while Figs. 7ª and 8ª illustrate details of construction of these parts.

The reference character C indicates the continuous circular web extending approximately throughout the whole plate midway its thickness and is provided on each of its faces with the vertically extending parallel ribs B, which are preferably cast integrally with the web.

K is a hole at the center of the plate through which material is passed from one chamber to another between the plates when the plates are assembled in the press. This hole is surrounded by hub J which in thickness corresponds approximately with the raised surfaces on the plate comprised by ribs B. The ribs adjacent the hub preferably terminate a short distance both above and below it, leaving an opening surrounding it, in order that downward flow of liquid may not be impeded by the hub.

The outer rim R of the plate is provided with the raised portions A extending entirely around the periphery on each side of the plate and preferably extending some distance beyond the outer surfaces of the ribs B. A groove H is formed around the periphery of the plate in rim R by terminating ribs B short of the outer edge 6 of the rim (see Figs. 1 and 4). The web C extends only a short distance into the rim terminating as shown in Fig. 4 at C¹, and the resulting openings P between the ribs H are extended to the outer periphery of the rim opening into groove H. By this construction, fluid may escape through apertures P in the rim at both the upper and lower extremities of the spaces between the ribs B. The groove H is adapted to receive a strip of soft packing which latter may be secured in position by a circular strip of metal or other convenient material held by common rings, or other suitable means and may be fastened by suitable devices, which latter may be passed through holes I in the rim. On the inside of the raised portion A of the rim is a machined surface D adapted to form a joint with the cell rings or drums E. One of these cell rings is illustrated in Figs. 5 and 6, $E^1$ and $E^2$ of which represent arms or lugs by which the cell ring is hung in the press.

F is a ring which may be cast in six or any desired number of segments, and is adapted to furnish means for securing the usual perforated member or filtering screen to the sides of the plate near the outer periphery of the filtering screen. The ring F is provided with holes $F^1$ which take bolts passing through holes O in the rim of the plate. Likewise for fastening the screens at the hub the ring G is provided having holes $G^1$ through which bolts may pass, entering the hub J through holes $J^1$. Lugs or arms L are provided on the rim of the plate, preferably cast integrally therewith, and are adapted to take the plain and grooved rollers indicated by the reference characters M and N respectively. These rollers coöperate with guides on the press for carrying the weight of the plate.

By this construction it will be seen that a plate is produced containing the maximum amount of strength with the minimum amount of material, the web being strengthened by the ribs B which hold the filtering screens out of contact with the web allowing the fluid to escape into the grooves between the ribs and be discharged through the openings P in the rim. Also the means provided for securing the filtering screens to the plate renders the screens readily removable for the purpose of cleaning.

The provision consisting of the opening or groove H adapted to be filled with a suitable packing, as described, makes the press practically liquid tight and if the press, while not in operation, be filled with any suitable solution, the parts of the press plate covered with accumulated particles will be acted upon by the solution and such particles softened until all of the parts may be readily cleansed by a stream or jet of water. It will be seen that the form of press plate as illustrated in the present invention is well adapted to be readily cleansed by the insertion of rods or wires through the openings or grooves between the ribs and that such rods or wires when inserted into the plate may pass through the openings in the rim, which are continuous with the grooves formed between the ribs.

The raised portion or rim A extending entirely around the periphery of the rim is adapted to fit against the outer edge of the cell rings, as shown in Fig. 4, thus preventing liquids or fluids, while the press is in operation under heavy pressure, from squirting or oozing out at the joinings between the press plates and the rings.

From an inspection of Fig. 3 in which is illustrated a section through the press plate at right angles to the direction of the ribs, the preferred form of the ribs will be seen and it will be observed that these ribs are narrower at the top than at the bottom where they join the web C, the top of the rib being oval or rounded and the joining of the rib with the web C being provided with a fillet, thus avoiding sharp corners or angles and making it much easier to keep the plate clean.

What I claim as new is—

1. In a filter press plate, in combination, a web, ribs projecting from each face of the web and extending beyond the periphery thereof, and a rim secured to the ribs and extending beyond the periphery of the web.

2. In a filter press plate, in combination, a web, ribs projecting from each face of the web and extending beyond the periphery thereof, and a rim secured to the ribs and extending beyond the periphery of the web and beyond the outer ends of the ribs.

3. In a filter press plate, in combination, a web, ribs projecting from each face of the web and extending beyond the periphery thereof, a rim secured to the ribs and extending beyond the periphery of the web, and apertures in the rim communicating with the spaces on the sides of the web between the ribs.

4. In a filter press plate, in combination, a web portion extending approximately across the whole area of the plate, ribs projecting from each face of the web and crossing it vertically at short distances apart leaving grooves between the ribs, the bottoms of the grooves being the faces of the web, a rim around the edge of the plate secured to the ribs and having a machined surface on its face lying approximately in the same plane as the plane of each face of the outer portions of the ribs, and apertures in the rim communicating with the said grooves as inlet and outlet continuations thereof, the said apertures being formed by extending the ribs beyond the periphery of the web and securing the rim near the faces of the outer portions of the ribs.

5. In a filter press plate, in combination, a web, ribs projecting from each face of the web and extending beyond the periphery thereof, a rim secured to the ribs and extending beyond the periphery of the web, and a ring adapted to be secured to the surface of the rim for binding the periphery of a filtering screen to the face of the plate.

6. In a filter press plate, in combination, a web portion extending approximately across the whole area of the plate, ribs projecting from each face of the web and crossing it vertically at short distances apart leaving grooves between the ribs, the bottoms of the grooves being the faces of the web, a rim around the edge of the plate having a surface approximately even with the plane of each face of the outer portions of the ribs, and a ring adapted to be secured on the face of the rim for binding the periphery of a filtering screen to the face of the plate.

7. In a filter press plate, the combination of a web portion extending approximately across the whole area of the plate, ribs projecting from each face of the web and crossing it vertically at short distances apart leaving grooves between the ribs, the bottoms of the grooves being the faces of the web, a rim around the edge of the plate having a face approximately even with the plane of each face of the outer portions of the ribs, apertures in the rim communicating with the said grooves as inlet and outlet continuations thereof, a hub at the center of the plate having raised faces approximately even with the plane of each face of the outer portion of the ribs, and rings adapted to be secured to the face of the said hub portion and to the face of the rim whereby a filter screen may be attached to the face of the plate at its center and at its periphery.

8. In a filter press plate, in combination, a web, ribs projecting from each face of the web and extending beyond the periphery thereof, a rim secured to the ribs and extending beyond the periphery of the web and beyond the outer ends of the ribs, and apertures in the rim communicating with the said spaces or grooves between the ribs forming outlet and inlet continuations thereof, and a groove in the periphery of the rim adapted to receive packing and the like, the said groove being formed by the extension of the rim beyond the outer ends of the ribs.

9. In a filter press plate, in combination, a web portion extending approximately across the whole area of the plate, ribs projecting from each face of the web and crossing it vertically at short distances apart leaving grooves between the ribs, the bottoms of the grooves being the faces of the web, a rim around the edge of the plate having a face approximately even with the plane of each face of the outer portions of the ribs, apertures in the rim communicating with the said grooves as inlet and outlet continuations thereof, and a rib on the face of the rim at its outer periphery and extending above the face thereof, whereby a cell ring or drum may be secured against lateral movement on the face of the plate.

10. In a filter press plate, in combination, a web, ribs projecting from each face of the web and extending beyond the periphery thereof, the said ribs being rounded at their outer edges and provided with integral fillets of material adjacent the line of their joining with the web whereby sharp corners or angles are avoided, and a rim secured to the ribs and extending beyond the periphery of the web.

In testimony whereof I have signed my name to this specification, in the presence of two subscribing witnesses, on this 4th day of October A. D. 1907.

JOHN W. BILES.

Witnesses:
FLORENCE C. QUINLAN,
STANLEY BRONNER.